(12) United States Patent
Nagai et al.

(10) Patent No.: US 8,687,643 B2
(45) Date of Patent: Apr. 1, 2014

(54) DATA TRANSMISSION DEVICE

(75) Inventors: Minoru Nagai, Fujisawa (JP); Hiroaki Miyata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 13/071,323

(22) Filed: Mar. 24, 2011

(65) Prior Publication Data

US 2011/0249684 A1 Oct. 13, 2011

(30) Foreign Application Priority Data

Apr. 12, 2010 (JP) ................................. 2010-091388

(51) Int. Cl.
  *H04L 12/28* (2006.01)

(52) U.S. Cl.
  USPC ........ 370/419; 370/230; 370/230.1; 370/217; 370/220

(58) Field of Classification Search
  USPC ............. 398/7, 42, 45, 46, 47, 48, 49, 50, 51, 398/54, 58; 370/229, 230, 230.1, 231, 235, 370/236, 395.2, 395.21, 395.53, 400, 400.1, 370/419, 427, 428, 429
  See application file for complete search history.

(56) References Cited

U.S. PATENT DOCUMENTS

| | | | | |
|---|---|---|---|---|
| 6,982,974 B1 * | 1/2006 | Saleh et al. | .................... | 370/386 |
| 7,113,700 B2 * | 9/2006 | Shimizu et al. | .................... | 398/33 |
| 7,388,876 B2 * | 6/2008 | Miyashita et al. | ............ | 370/428 |
| 7,602,800 B2 * | 10/2009 | Endo et al. | .................... | 370/420 |
| 7,920,559 B2 * | 4/2011 | Shiota et al. | .................... | 370/389 |
| 8,139,947 B2 * | 3/2012 | Ojima | ........................... | 398/135 |
| 2003/0091057 A1 * | 5/2003 | Miyashita et al. | ............ | 370/428 |
| 2005/0030951 A1 * | 2/2005 | Maciocco et al. | ......... | 370/395.2 |
| 2006/0050690 A1 * | 3/2006 | Epps et al. | .................... | 370/359 |
| 2006/0072923 A1 * | 4/2006 | Arikawa et al. | ............... | 398/155 |
| 2006/0203847 A1 | 9/2006 | Toyoda | | |
| 2006/0233185 A1 * | 10/2006 | Ozaki | ......................... | 370/404 |
| 2007/0237177 A1 * | 10/2007 | Endo et al. | .................... | 370/468 |
| 2008/0175262 A1 * | 7/2008 | Kawano et al. | ............... | 370/428 |
| 2008/0225887 A1 * | 9/2008 | Shiota et al. | .................. | 370/465 |
| 2009/0185804 A1 * | 7/2009 | Kai et al. | ........................ | 398/48 |
| 2010/0021161 A1 * | 1/2010 | Endo et al. | ..................... | 398/45 |
| 2010/0098422 A1 * | 4/2010 | Takeda | ........................... | 398/79 |
| 2011/0116798 A1 * | 5/2011 | Kai | ................. | 398/58 |
| 2012/0170928 A1 * | 7/2012 | Tanaka et al. | .................. | 398/28 |
| 2012/0294612 A1 * | 11/2012 | Maeda et al. | .................. | 398/51 |

FOREIGN PATENT DOCUMENTS

JP 2006-253852 9/2006

OTHER PUBLICATIONS

Toyoda, Hidehiro; High-speed LAN Technologies for 100GbE; Proceedings of the 2010 IEICE General Conference, Sendai, Japan, Mar. 16-19, 2010; pp. SS-87-SS-88.

Kawano, Yoshiyuki, et al.; LACP Based Dynamic Link Control Scheme for Energy Efficient Ethernet; pp. 343-348; IEICE Technical Report, vol. 107 No. 525; Feb. 28, 2008; pp. 343-348.

Aibara, Shinji, et al.; Power Saving Architecture with Link Aggregation on Ethernet Switch; IEICE Technical Report, IN 2006-147(2007-1); Jun. 1, 2007; pp. 55-60.

IEEE Std 802.3-2008; Part 3: Carrier Sense Multiple Access with Collision Detection (CSMA/CD) Access Method and Physical Layer Specifications; Clauses 44-55; 2008; pp. 1-586.

IEEE Std 802.1AX-2008; IEEE Standard for Local and Metropolitan Area Networks—Link Aggregation; Nov. 3, 2008; pp. 1-144.

IEEE P802.3ba Task Force Baseline Adoption Summary, Task Force Meeting; May 13, 2008; Munich, Germany; 60 pages.

* cited by examiner

*Primary Examiner* — Ian N Moore
*Assistant Examiner* — Phong La
(74) *Attorney, Agent, or Firm* — Foley & Lardner LLP

(57) ABSTRACT

A data transmission device includes a unit that changes the number and combination of optical communication paths forming a virtual communication path. The data transmission device has functions of forming a virtual communication path by connecting only the number of optical communication paths satisfying a required bandwidth and of turning off operation circuits forming unconnected optical communication paths.

4 Claims, 16 Drawing Sheets

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| TRANSMISSION LANE ID (320) | TRANSMISSION LANE CONNECTION STATE (330) |
|---|---|
| 1 | ON |
| 2 | ON |
| 3 | OFF |
| ... | ... |
| n | OFF |

| | | |
|---|---|---|
| 300 | REQUIRED BANDWIDTH | 5.0 → 2.5 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| TRANSMISSION LANE ID (320) | TRANSMISSION LANE CONNECTION STATE (330) |
|---|---|
| 1 | ON |
| 2 | ON |
| 3 | OFF |
| ... | ... |
| n | OFF |

| | | |
|---|---|---|
| 300 | REQUIRED BANDWIDTH | 2.5 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 → 1 |
| 304 | TRANSMISSION LINE BANDWIDTH | 5.0 → 2.5 Gbit/s |

| TRANSMISSION LANE ID (320) | TRANSMISSION LANE CONNECTION STATE (330) |
|---|---|
| 1 | ON |
| 2 | ON → OFF |
| 3 | OFF |
| ... | ... |
| n | OFF |

| | | |
|---|---|---|
| 300 | REQUIRED BANDWIDTH | 2.5 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 1 |
| 304 | TRANSMISSION LINE BANDWIDTH | 2.5 Gbit/s |

| TRANSMISSION LANE ID (320) | TRANSMISSION LANE CONNECTION STATE (330) |
|---|---|
| 1 | ON |
| 2 | OFF |
| 3 | OFF |
| ... | ... |
| n | OFF |

| | | |
|---|---|---|
| 300 | REQUIRED BANDWIDTH | 2.5 → 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 1 |
| 304 | TRANSMISSION LINE BANDWIDTH | 2.5 Gbit/s |

| TRANSMISSION LANE ID (320) | TRANSMISSION LANE CONNECTION STATE (330) |
|---|---|
| 1 | ON |
| 2 | OFF |
| 3 | OFF |
| ... | ... |
| n | OFF |

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 1 → 2 |
| 304 | TRANSMISSION LINE BANDWIDTH | 2.5 → 5.0 Gbit/s |

| TRANSMISSION LANE ID (320) | TRANSMISSION LANE CONNECTION STATE (330) |
|---|---|
| 1 | ON |
| 2 | OFF → ON |
| 3 | OFF |
| ... | ... |
| n | OFF |

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| TRANSMISSION LANE ID (320) | TRANSMISSION LANE CONNECTION STATE (330) | CUMULATIVE OPERATING TIME (340) |
|---|---|---|
| 1 | ON | 10000h (MEASUREMENT IN PROGRESS) |
| 2 | ON | 5000h (MEASUREMENT IN PROGRESS) |
| 3 | OFF | 0h (MEASUREMENT STOPPED) |
| ... | ... | ... |
| n | OFF | 0h (MEASUREMENT STOPPED) |

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| TRANSMISSION LANE ID (320) | TRANSMISSION LANE CONNECTION STATE (330) | CUMULATIVE OPERATING TIME (340) |
|---|---|---|
| 1 | ON | 10000h (MEASUREMENT IN PROGRESS) |
| 2 | ON | 5000h (MEASUREMENT IN PROGRESS) |
| 3 | OFF | 0h (MEASUREMENT STOPPED) |
| ... | ... | ... |
| n | OFF | 0h (MEASUREMENT STOPPED) |

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| TRANSMISSION LANE ID (320) | TRANSMISSION LANE CONNECTION STATE (330) | CUMULATIVE OPERATING TIME (340) |
|---|---|---|
| 1 | ON | 10000h (MEASUREMENT IN PROGRESS) |
| 2 | ON | 5000h (MEASUREMENT IN PROGRESS) |
| 3 | OFF → ON | START MEASUREMENT |
| ... | ... | ... |
| n | OFF | 0h (MEASUREMENT STOPPED) |

| | | |
|---|---|---|
| 300 | REQUIRED BANDWIDTH | 5.0 Gbit/s |
| 301 | TRANSMISSION LANE BANDWIDTH | 2.5 Gbit/s |
| 302 | MAXIMUM TRANSMISSION LANE COUNT | n |
| 303 | CONNECTED TRANSMISSION LANE COUNT | 2 |
| 304 | TRANSMISSION LINE BANDWIDTH | 5.0 Gbit/s |

| 320 | 330 | 340 |
|---|---|---|
| TRANSMISSION LANE ID | TRANSMISSION LANE CONNECTION STATE | CUMULATIVE OPERATING TIME |
| 1 | ON → OFF | 10000h (MEASUREMENT STOPPED) |
| 2 | ON | 5000h (MEASUREMENT IN PROGRESS) |
| 3 | OFF | 1h (MEASUREMENT IN PROGRESS) |
| ... | ... | ... |
| n | OFF | 0h (MEASUREMENT STOPPED) |

DATA TRANSMISSION DEVICE

CLAIM OF PRIORITY

The present application claims priority from Japanese patent application serial no. 2010-091388, filed on Apr. 12, 2010, the content of which is hereby incorporated by reference into this application.

BACKGROUND OF THE INVENTION

The present invention relates to a data transmission device that accommodates multiple lines and transfers data.

In particular, the invention relates to a data transmission device that multiplexes multiple optical communication paths to form one virtual communication path. This data transmission device changes the configuration of the virtual communication path in accordance with the communication capacity or operating time and turns off a nonoperating optical communication path.

With the widespread use of the Internet and the broadening of the band of content used thereon, the transmission speed of relay networks has been increased.

For the Ethernet, the current fastest transmission speed is 10 Gbits/s (see IEEE STD802.3-2008 EDITION, SECTION 4, "PART 3: CARRIER SENSE MULTIPLE ACCESS WITH COLLISION DETECTION (CSMA/CD) ACCESS METHOD AND PHYSICAL LAYER SPECIFICATIONS", CLAUSES 44-55), and 40 Gbits/s and 100 Gbits/s-support standards are soon to make their debut (see IEEE P802.3BA TASK FORCE MEETING, MAY 2008, MUNICH, GERMANY, "BASELINE SUMMARY"). Accordingly, the transmission speed of an interface connected to a relay network of line concentrators and layer 2/layer 3 (L2/L3) gateway devices, both of which aggregate user lines (network), also must be increased in accordance with increases in the transmission speed of the relay network.

However, the bandwidth required by user lines (network) accommodated by a line concentrator or L2/L3 gateway device varies with the accommodation state and application of the user lines (network). If there are a large number of user lines (network) corresponding to broadband content such as moving images, the required bandwidth is a wide bandwidth. This may result in the exhaustion of the bandwidth of an interface connected to the relay network. In contrast, if static content is dominant, the required bandwidth may be relatively narrow. This does not result in the exhaustion of the bandwidth of an interface connected to the relay network.

As seen, the required bandwidth varies depending on the configuration of the user lines (network) accommodated by the line concentrator or L2/L3 gateway device. If the bandwidth of an interface connected to the relay network is not used to the extent that the bandwidth is exhausted, the nonoperating communication resource will be wasted.

To counter this problem, it is considered to use link aggregation (IEEE STD802.1AX-2008 EDITION, IEEE STANDARD FOR LOCAL AND METROPOLITAN AREA NETWORKS LINK AGGREGATION). In link aggregation, multiple lines can be handled as a single virtual communication path, and the bandwidth is the sum of the respective bandwidths of the connected lines. Accordingly, the communication cost can be minimized by connecting only the number of lines satisfying the required bandwidth.

In link aggregation, however, changing the number of connected lines in accordance with, for example, an increase in the required bandwidth requires line addition work. Similarly, reducing the bandwidth requires line reduction work. Further, such work involves manual setup work and a negotiation with the opposite device, thereby losing operational flexibility.

For these reasons, there has been proposed a method of performing communications using only the number of optical communication paths satisfying the required bandwidth while using wavelength-division multiplexing (see JP-A-2006-253852). This method allows a dynamic change in the combination of operating optical communication paths. As used herein, "wavelength-division multiplexing" refers to a technology where multiple optical communication paths having different wavelengths are multiplexed so that communications can be performed on a single optical fiber.

SUMMARY OF THE INVENTION

In the technology of JP-A-2006-253852, the optical communication paths leading to the opposite device are valid, although no data is transmitted to nonoperating optical communication paths. Thus, the circuits (electric-optic conversion unit, P/S conversion unit, coding unit, etc.) forming the optical communication paths are kept active. That is, electric power for operating these circuits is wasted. In particular, the power consumption of the electric-optic conversion unit is increased as the communication distance becomes longer or as the communication speed becomes higher. Accordingly, in devices handling many optical communication paths, such power consumption is not negligible.

On the other hand, the technology of JP-A-2006-253852 has the function of optionally selecting the combination of operating optical communication paths and nonoperating ones. However, once the combination is determined, the combination can be changed only when a bandwidth change request is made by the user. Thus, if a change request is not made frequently, the operating time of a particular optical communication path will continue to increase. As a result, this particular optical communication path will be more likely to fail than optical communication paths whose operating time is shorter. If only one communication path is connected, the communication will be interrupted.

A data transmission device according to a first aspect of the present invention includes: a line accommodation unit connected to accommodated lines; a transmission unit that transmits transmission data received from the line accommodation unit to a transmission line; a reception unit that receives a signal from a reception line and transfers the received signal to the line accommodation unit; and a control unit that controls the line accommodation unit, the transmission unit, and the reception unit. The transmission unit includes: a plurality of transmission lanes; a multiplexing unit that multiplexes outputs of the transmission lanes; a transmission line selection unit that divides the transmission data and distributes the divided transmission data to the transmission lanes; and a transmission lane management unit that transmits a transmission lane switching signal to the transmission line selection unit. The control unit determines the number of operating ones of the transmission lanes on the basis of required-bandwidth information. The transmission lane management unit transmits transmission lane on/off signals for controlling turn-on/turn-off of the transmission lanes to the transmission lanes on the basis of the number of the operating transmission lanes.

A data transmission device according to a second aspect of the present invention includes: a line accommodation unit connected to accommodated lines; a transmission unit that transmits transmission data received from the line accommodation unit to a transmission line; a reception unit that receives a signal from a reception line and transfers the received signal to the line accommodation unit; and a control unit that controls the line accommodation unit, the transmission unit, and the reception unit. The reception unit includes: a plurality of reception lanes; a demultiplexing unit that demultiplexer the received data for the reception lanes; a plurality of reception lane buffers corresponding to the reception lanes; a reception buffer; and a switch that selects any one of signals of the reception lane buffers and transfers the selected signal to the reception buffer and. On the basis of ID information of a transmission lane from an opposite device, the switch regards data outputted by a corresponding one of the reception lanes as valid and transfers the data to the reception buffer.

A data transmission device according to a third aspect of the present invention includes: a line accommodation unit connected to accommodated lines; a transmission unit that transmits transmission data received from the line accommodation unit to a transmission line; a reception unit that receives a signal from a reception line and transfers the received signal to the line accommodation unit; and a control unit that controls the line accommodation unit, the transmission unit, and the reception unit. The transmission unit includes: a plurality of transmission lanes; a multiplexing unit that multiplexes outputs of the transmission lanes; a transmission line selection unit that divides the transmission data and distributes the divided transmission data to the transmission lanes; and a transmission lane management unit that transmits a transmission lane switching signal to the transmission line selection unit. The transmission lane management unit transmits transmission lane on/off signals for controlling turn-on/turn-off of the transmission lanes to the transmission lanes on the basis of the operating times of the transmission lanes.

According to the present invention, power consumption can be reduced by turning off operation circuits forming nonoperating optical communication paths. Further, the operating times of the optical communication paths can be leveled by changing a connected optical communication path to another as necessary.

BRIEF DESCRIPTION OF THE DRAWINGS

Preferred embodiments of the present invention will now be described in conjunction with the accompanying drawings, in which;

FIG. 5 is a diagram (1) showing a line management table;

FIG. 6 is a diagram (1) showing a transmission lane management table;

FIG. 9 is a diagram (2) showing a transmission lane management table;

FIG. 10 is a diagram (3) showing a line management table;

FIG. 11 is a diagram (3) showing a transmission lane management table;

FIG. 13 is a diagram (4) showing a line management table;

FIG. 14 is a diagram (4) showing a transmission lane management table;

FIG. 15 is a diagram (5) showing a line management table;

FIG. 16 is a diagram (5) showing a transmission lane management table;

FIG. 17 is a diagram (6) showing a line management table;

FIG. 18 is a diagram (6) showing a transmission lane management table;

FIG. 21 is a diagram (7) showing a line management table;

FIG. 22 is a diagram (1) showing another transmission lane management table;

FIG. 23 is a diagram (8) showing a line management table;

FIG. 24 is a diagram (2) showing another transmission lane management table;

FIG. 25 is a diagram (9) showing a line management table;

FIG. 26 is a diagram (3) showing another transmission lane management table;

FIG. 27 is a diagram (10) showing a line management table;

FIG. 28 is a diagram (4) showing another transmission lane management table.

DETAILED DESCRIPTION OF THE PREFERRED EMBODIMENTS

Figure 1:
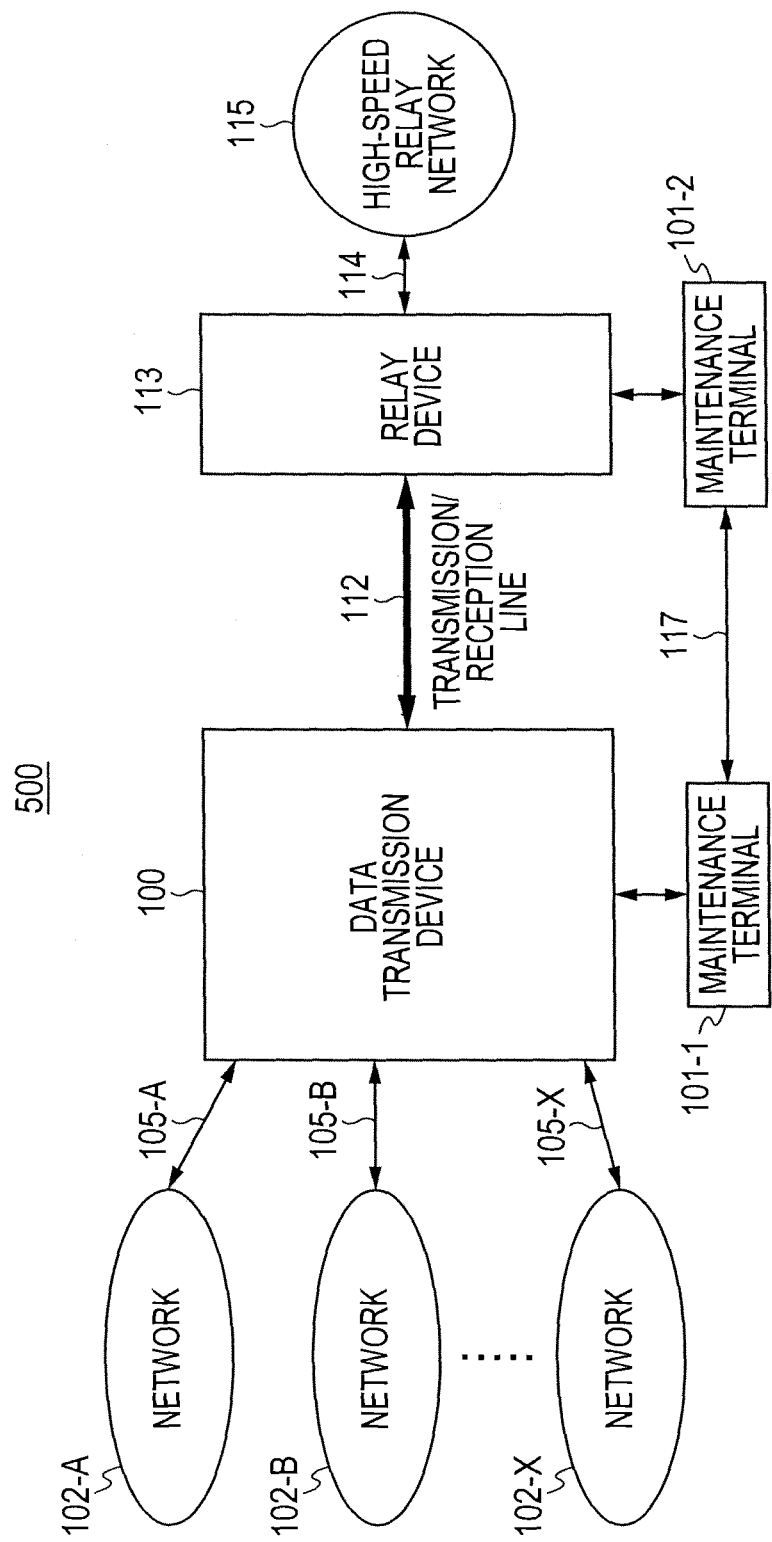
FIG. 1 is a block diagram showing the configuration of a communication network.

Now, embodiments will be described in detail with reference to the accompanying drawings. Substantially the same components are assigned the same reference numerals and will not be described again.

First Embodiment

Referring to FIG. 1, the configuration of a communication network 500 will be described. In FIG. 1, the communication network 500 includes a data transmission device 100, a relay device 113, a high-speed relay network 115, a maintenance terminal 101, and multiple networks 102. The data transmission device 100 is connected to the networks 102 via lines 105 accommodated therein. The data transmission device 100 is controlled by a maintenance terminal 101-1.

The data transmission device 100 is connected to the relay device 113 via a transmission/reception line 112.

The relay device 113 is controlled by a maintenance terminal 101-2. The relay device 113 is connected to the high-speed relay network 115 via a line 114. The two maintenance terminals 101 are connected via a maintenance line 117.

Figure 2:
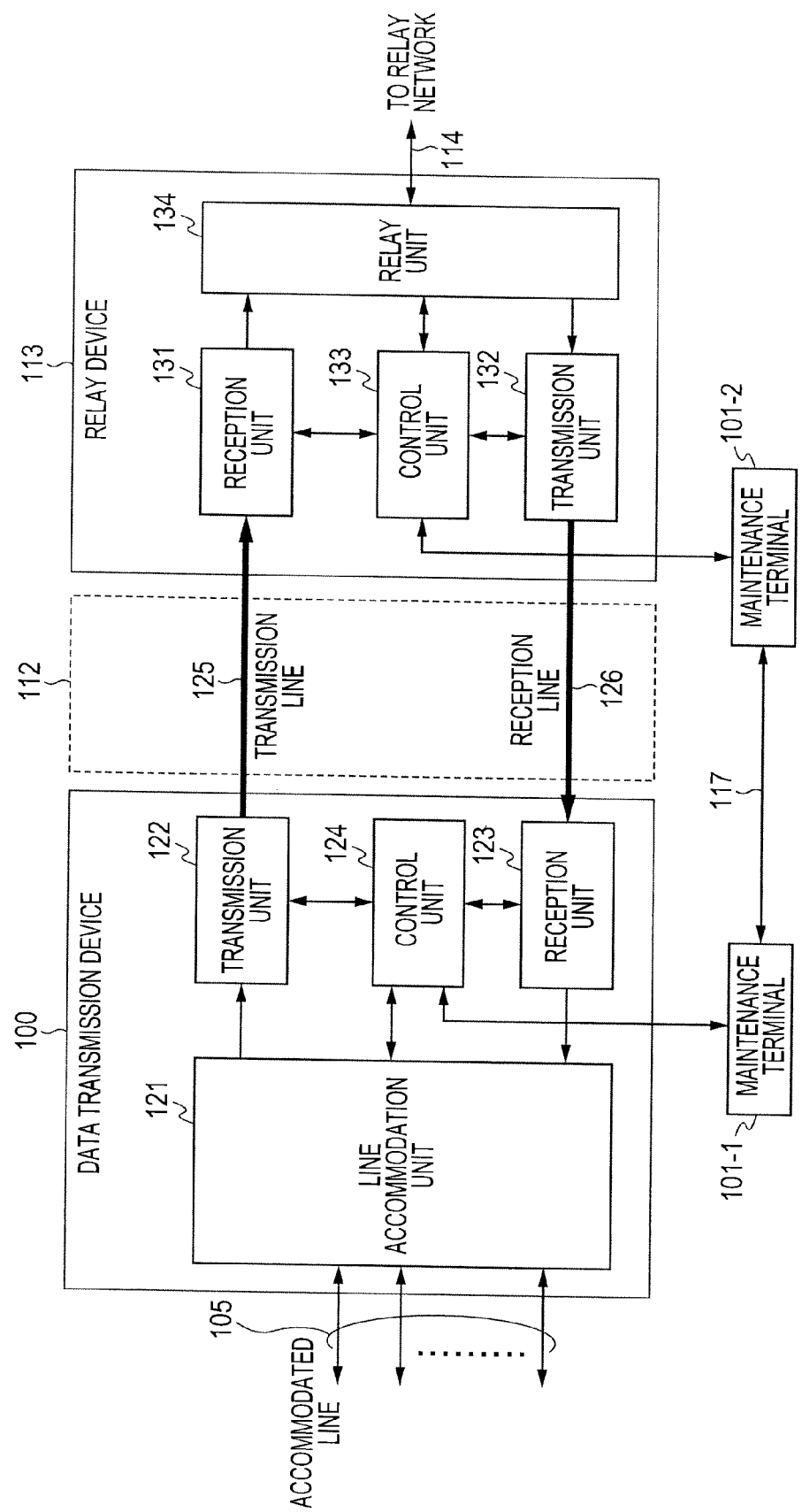
FIG. 2 is a block diagram showing the configurations of a data transmission device and a relay device.

Referring to FIG. 2, the configurations of the data transmission device 100 and the relay device 113 will be described briefly. In FIG. 2, the data transmission device 100 includes a line accommodation unit 121, a transmission unit 122, a reception unit 123, and a control unit 124. The line accommodation unit 121 accommodates the lines 105. The transmission unit 122 outputs transmission data outputted by the line accommodation unit 121 to the opposite relay device 113. The reception unit 123 receives reception data from the opposite relay device 113 and outputs the data to the line accommodation unit 121. The control unit 124 controls the line accommodation unit 121, the transmission unit 122, and the reception unit 123.

The maintenance terminal 101-1 is connected to the control unit 124 to control the data transmission device 100. It is also connected to the opposite maintenance terminal 101-2 of the relay device 113 via the maintenance line 117. The transmission unit 122 and the reception unit 123 are connected to the opposite relay device 113 via a transmission line 125 and a reception line 126, respectively. While wavelength-division multiplexing is used in the transmission line 125 and the reception line 126, other methods may be used.

The opposite relay device 113 includes a reception unit 131, a transmission unit 132, a control unit 133, and a relay unit 134. The reception unit 131 is connected to the transmission line 125. The transmission unit 132 is connected to the reception line 126. The relay unit 134 is connected to the reception unit 131 and the transmission unit 132 to communicate with the high-speed relay network 115. The control unit 133 controls the transmission unit 132, the reception unit 131, and the relay unit 134. The maintenance terminal 101-2 is connected to the control unit 133 to control the relay device 113.

Figure 3:
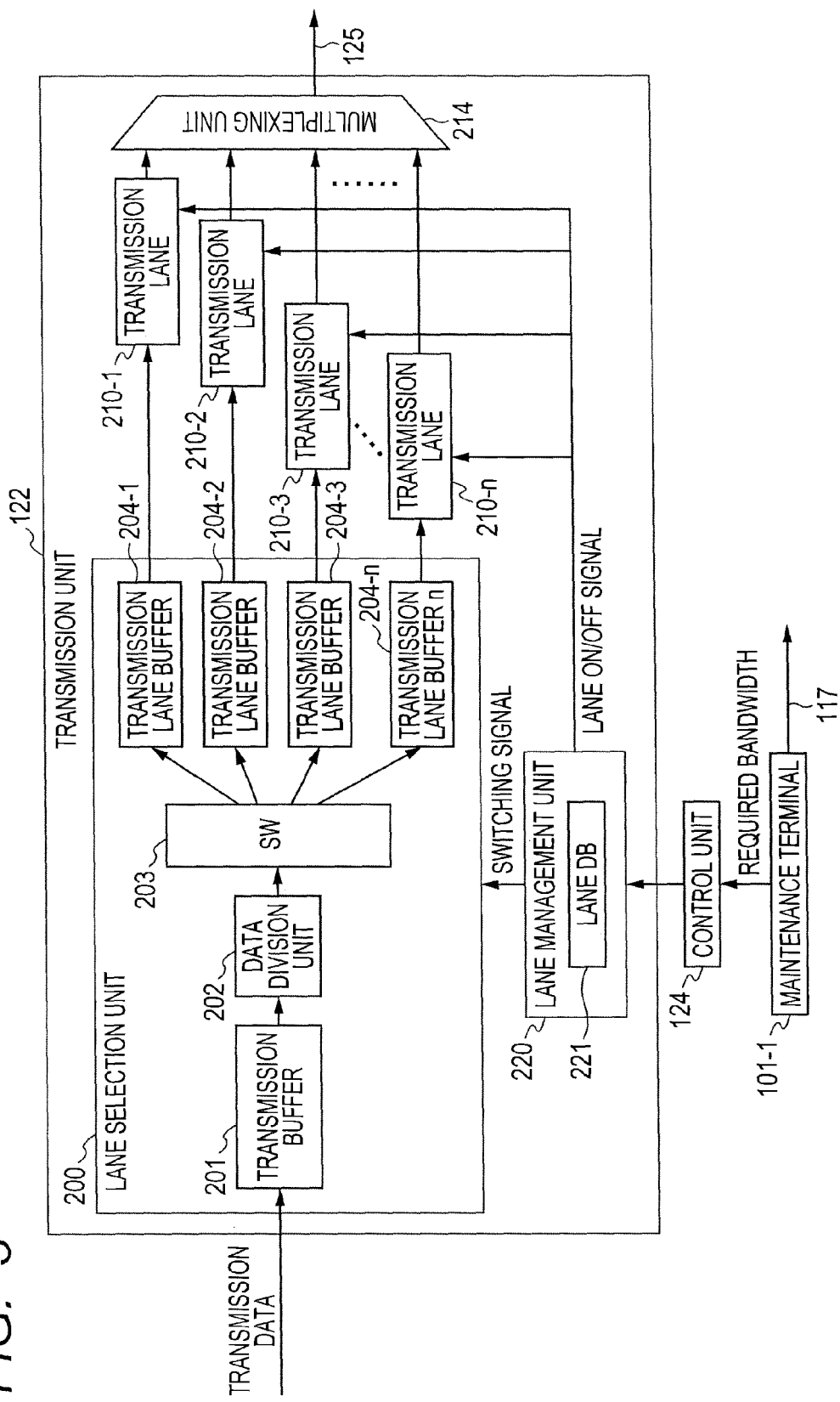
FIG. 3 is a block diagram (1) of a transmission unit of the data transmission device.
Figure 4:
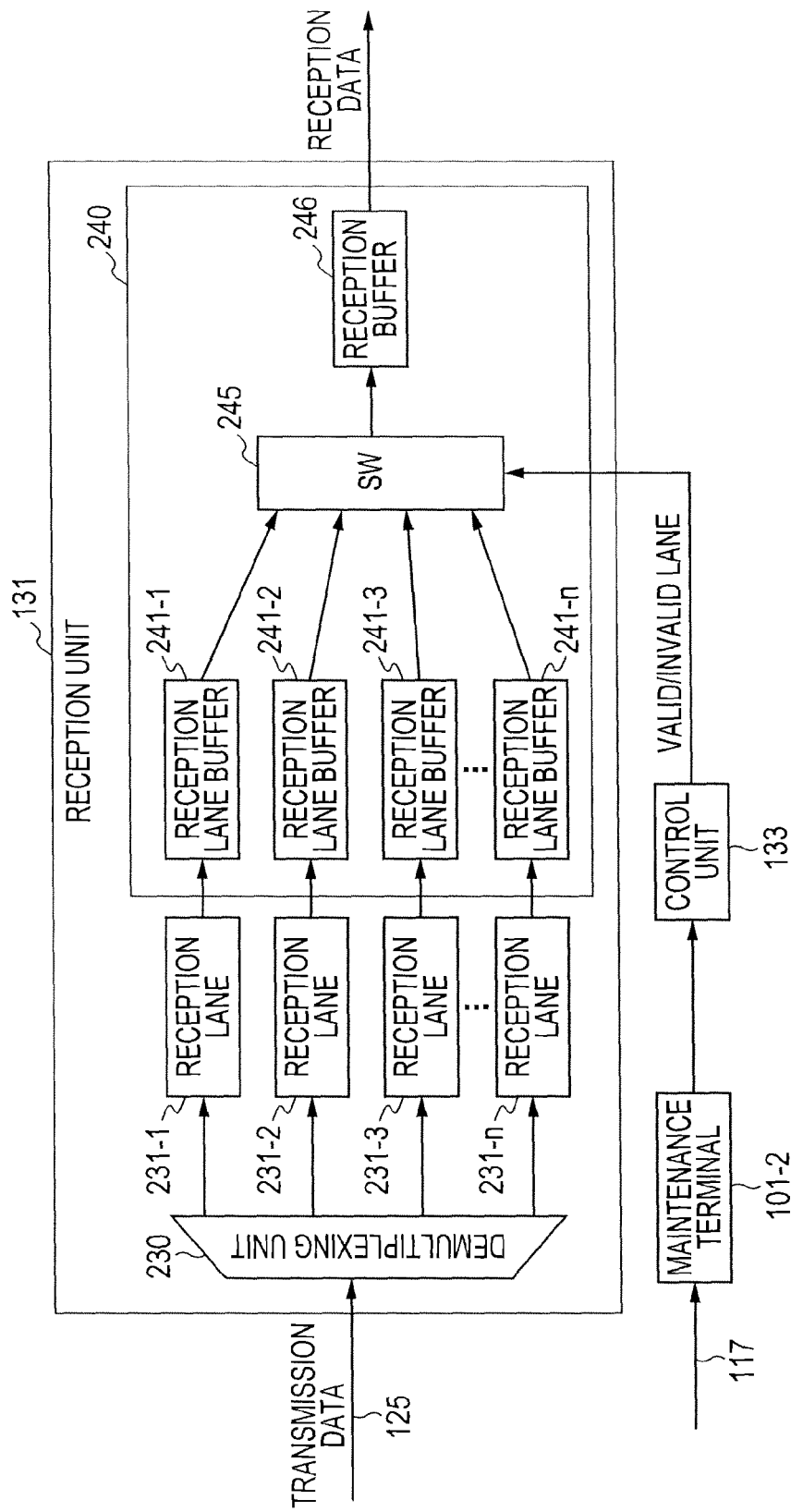
FIG. 4 is a block diagram of a reception unit of the data transmission device.

Referring to FIGS. 3 and 4, the configuration of the transmission unit 122 of the data transmission device 100 and that of the reception unit 131 of the relay device 113 will be described.

In FIG. 3, the transmission unit 122 of the data transmission device 100 includes a lane selection unit 200, n number of transmission lanes 210, a multiplexing unit 214, and a lane management unit 220. The lane selection unit 200 includes a transmission buffer 201, a data division unit 202, a switch (SW) 203, and n number of transmission lane buffers 204. The lane management unit 220 holds a lane database (lane DB) 221.

The lane selection unit 200 accumulates transmission data transmitted by the line accommodation unit 121 in the transmission buffer 201. The transmission data may be in any form, including IP packet and MAC frame.

The transmission buffer 201 transmits the accumulated transmission data to the data division unit 202. The data division unit 202 divides the transmission data into any lengths according to the output format such as the number of transmission lanes of the output destination, protocol, or coding scheme. At that time, the data division unit 202 may add data for identifying the divided data.

The transmission buffer 202 then transfers the divided transmission data to the SW 203. The SW 203 outputs the divided transmission data to the relevant transmission lane buffers 204 in accordance with the predetermined output destination and output order. As for the selection of the output destinations, instead of selecting all the transmission lanes 204 uniformly, any transmission lane buffers may be selected and the divided data may be outputted to the selected transmission lanes at any timing. For example, the following transmission lane buffers may be selected as output destinations: (1) only a particular transmission lane buffer; (2) all transmission lane buffers other than a particular transmission lane buffer; and (3) only the transmission lane buffers 204-1 and 204-3. Alternatively, the output destination transmission lane buffers 204 may be selected using identification data added to the divided transmission data.

The transmission lane buffers 204 receive the divided transmission data and output the transmission data to the transmission lanes 210 connected thereto. The transmission lanes 210 encode the transmission data into data form according to the line form of the transmission line 125 and perform media conversion on the encoded data and then output the resulting data to the multiplexing unit 214. The coding scheme used at that time may be a scheme specified in the Ethernet or any other scheme may be used. While, in this embodiment, electric-optic conversion is used in the transmission lanes 210 as the media conversion method, other conversion methods may be used. Different wavelengths are specified as the optical wavelengths used in the transmission lanes 210.

The multiplexing unit 214 receives the transmission data from the transmission lanes 210 and multiplexes the received data in accordance with the line form of the transmission line 125. While wavelength-division multiplexing is used in this embodiment, other methods may be used.

In FIG. 4, the reception unit 131 of the relay device 113 includes a demultiplexing unit 230, n number of reception lanes 231, and a data restoration unit 240. The data restoration unit 240 includes n number of reception lane buffers 241, a SW 245, and a reception buffer 246.

The demultiplexing unit 230 of the reception unit 131 of the opposite relay device performs conversion of a type inverse to multiplexing performed by the multiplexing unit 214 on the transmission data outputted to the transmission line 125 so as to divide the transmission data into pieces of reception data. The demultiplexing unit 230 outputs the pieces of demultiplexed reception data to the corresponding reception lanes 231.

The reception lanes 231 receive the pieces of reception data and perform on them media conversion inverse to that in the transmission lanes 210 as well as decoding. The reception lanes 231 output the resulting pieces of reception data to the data restoration unit 240.

The reception lane buffers 241 of the data restoration unit 240 receive the pieces of reception data and output them to the SW 245. The SW 245 receives the pieces of reception data and identifies the reception lane buffers 241 that have outputted the received pieces of reception data. The SW 245 outputs the pieces of reception data to the reception buffer 246 in the order before the transmission data is divided by the data division unit 202 of the transmission unit 122. The reception buffer 246 outputs the pieces of data to the relay unit 134.

With regard to a reception lane 231 corresponding to a transmission lane 210 that does not transmit data, the SW 245 outputs an idle pattern to the reception buffer 246. Alternatively, for example, the SW 245 outputs only the received data to the reception buffer 246.

Back in FIG. 3, the lane management unit 220 contains a lane DB 221, which manages the state of the transmission line 125. The lane management unit 220 transmits to the lane selection unit 200 a switching signal for instructing the lane selection unit 200 to output or not to output data to each transmission lane 210. The lane management unit 220 also transmits to the transmission lanes 210-1 to 210-n lane-on/off signals for turning them on or off.

The lane management unit 220 also stores in a lane DB lane DB 221 a required bandwidth that is reported by the maintenance terminal 101-1 via the control unit 124 and that the data transmission device 100 should realize.

The maintenance terminal 101-1 reports the ID of the currently operating transmission lane to the maintenance terminal 101-2 of the relay device 113 via the maintenance line 117.

Back in FIG. 4, the maintenance terminal 101-2 of the relay device 113 reports the ID of the operating transmission lane to the control unit 133. The control unit 133 reports to the SW 245 a reception lane 231 which is to receive the reception data.

Referring to FIGS. 5 and 6, details of management performed by the lane DB 221 will be described. The lane DB 221 is composed of a line management table 310 shown in FIG. 5 and a transmission lane management table 350 shown in FIG. 6.

In FIG. 5, the line management table 310 is composed of a required bandwidth 300, a transmission lane bandwidth 301, a maximum transmission lane count 302, a connected transmission lane count 303, and a transmission line bandwidth 304. The required bandwidth 300 is a bandwidth required by the accommodated lines. The transmission lane bandwidth 301 is a bandwidth of each of the transmission lanes forming the transmission line. The maximum transmission lane count 302 represents the maximum number of transmission lanes forming the transmission line. The connected transmission lane count 303 represents the number of transmission lanes currently connected. The transmission line bandwidth 304 represents the bandwidth of the transmission line.

In FIG. 6, the transmission lane management table 350 manages the respective connection states of the transmission lanes forming the transmission line. The transmission lane management table 350 is composed of a transmission lane ID 320 and a transmission lane connection state 330. The transmission lane ID 320 manages IDs assigned to the transmission lanes. The transmission lane connection state 330 manages the respective connection states of the transmission lanes.

Back in FIG. 5, the required bandwidth is set to 5.0 Gbits/s. The transmission lane bandwidth is set to 2.5 Gbits/s. The maximum transmission lane count is set to n. Accordingly, the connected transmission lane count is set to 2 so that the transmission line bandwidth is equal to or greater than the required bandwidth.

Back in FIG. 6, of the transmission lanes having IDs 1 to n, the operating transmission lanes are two transmission lanes having IDs 1 and 2. This is understood from the fact that the connection states of the lanes having IDs 1 and 2 are both on. On the other hand, the connection states of the transmission lanes having IDs 3 to n are all off. Note that the transmission lane bandwidth and the required bandwidth shown in FIG. 5 may be set to any values.

Figures 7, 8:
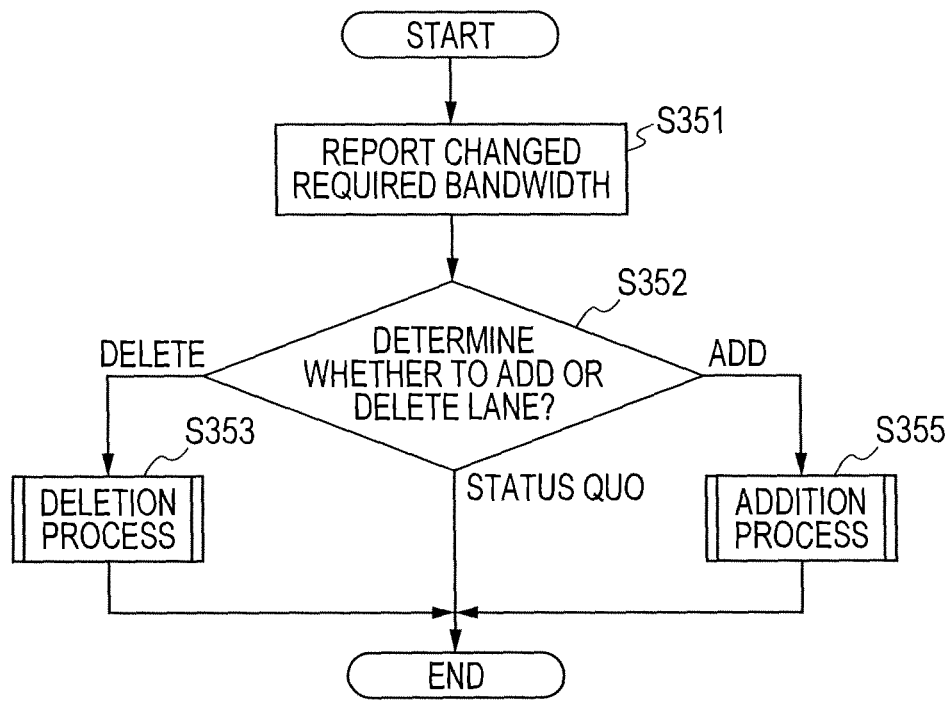
FIG. 7 is a flowchart of a data transmission device lane addition/deletion process.
FIG. 8 is a diagram (2) showing a line management table.

Referring to FIG. 7, the flow of a required-bandwidth change process will be described. Assume that the data transmission device 100 is operating on the basis of the settings in the lane DB 221 shown in FIGS. 5 and 6. In FIG. 7, when a change in the accommodated line configuration changes the required bandwidth, the maintenance terminal 101-1 reports the changed required bandwidth to the control unit 124 of the data transmission device 100. The control unit 124 reports the changed required bandwidth to the lane management unit 220 within the transmission unit 122 (S351). The lane management unit 220 compares the reported required bandwidth with the previously specified required bandwidth 300 (S352). If the reported required bandwidth is the same value as the previously specified one, the lane management unit 220 determines that the status quo should be maintained and completes the process without changing the connection state.

If the reported required bandwidth falls below the previously specified required bandwidth, the lane management unit 220 performs a connected lane deletion process (S353) and completes the required-bandwidth change process. In contract, if the reported required bandwidth exceeds the previously specified one, the lane management unit 220 performs a connected lane addition process (S355) and completes the required-bandwidth change process.

Figure 12:
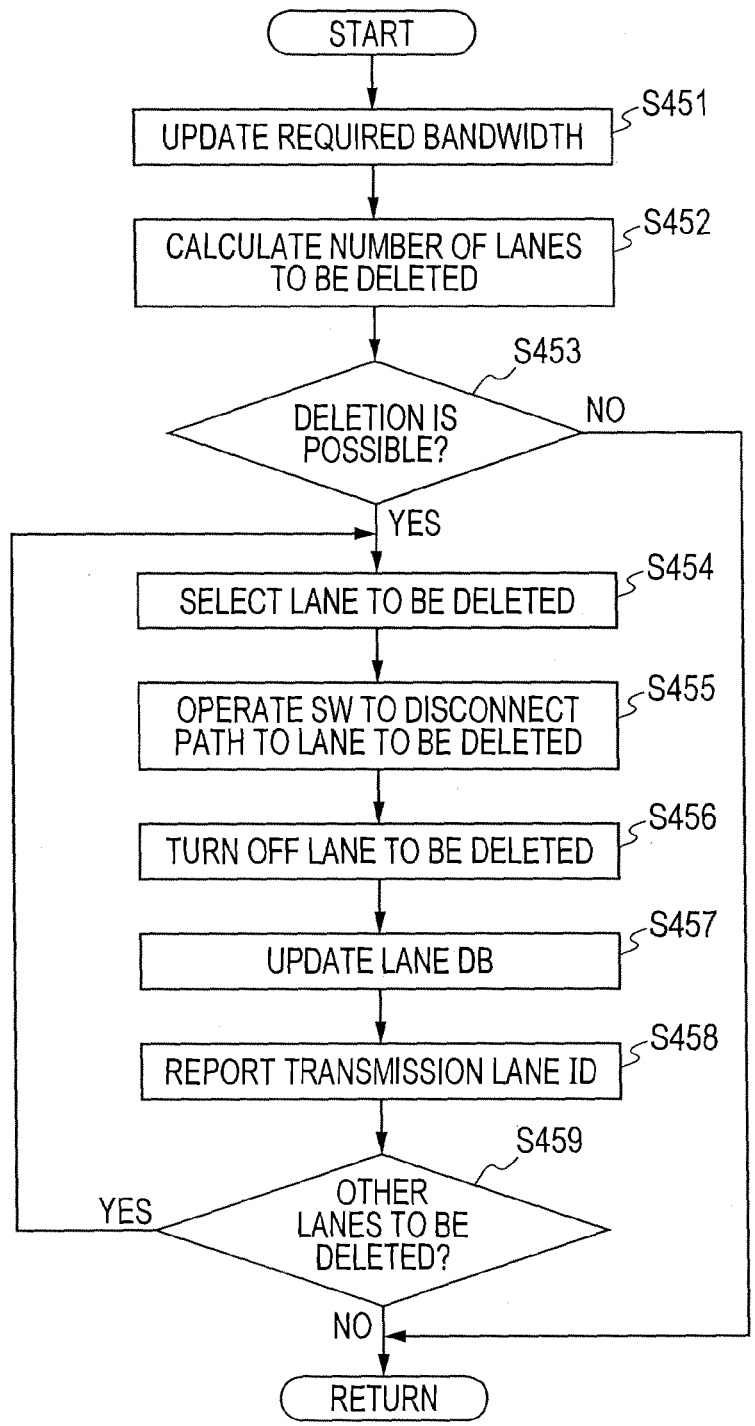
FIG. 12 is a flowchart of a data transmission device lane deletion subroutine.

Referring to FIGS. 8 to 12, the connected is transmission lane count reduction process will be described. In FIG. 12, the lane management unit 220 updates the required bandwidth of the line management table 310 to the new required bandwidth reported by the control unit 124 (S451). For example, as shown in FIG. 8, the required bandwidth is changed from 5.0 Gbits/s to 2.5 Gbits/s. The lane management unit 220 then calculates the number of lanes to be deleted (S452). Specifically, the lane management unit 220 demultiplexes the required bandwidth by the transmission lane bandwidth (fraction rounded up) and compares the value obtained with the connected transmission lane count. The lane management unit 220 then determines whether there are connected transmission lanes that can be deleted (S453). Here, 2.5 [Gbits/s]/ 2.5 [Gbits/s]=1. The value obtained falls below the connected transmission lane count, 2.

Accordingly, the lane management unit 220 determines that there are transmission lanes which can be deleted. Since the difference is 2−1=1, the lane management unit 220 determines that the number of lanes to be deleted is 1. If the comparison results in equality (S453: NO), the lane management unit 220 determines that there are no transmission lanes that can be deleted and completes the process. Note that the calculated number of lanes to be deleted may be multiple.

If step 453 is YES, the lane management unit 220 selects a transmission lane to be deleted actually (S454). The lane management unit 220 checks the transmission lane connection state of the transmission lane management table 350 to check whether there are transmission lane IDs which are on. Since the transmission lane IDs 1 and 2 are on in FIG. 9, the lane management unit 220 determines that any one of them should be deleted. Specifically, the transmission lane ID 2 is selected. The method and condition for selection are determined freely.

After selecting the transmission lane to be deleted, the lane management unit 220 transmits to the lane selection unit 200 a switching signal for disconnecting a connection path leading to the selected transmission lane. The lane selection unit 200 then operates the SW 203 to interrupt data transmission to the selected transmission lane (S455). Specifically, the lane selection unit 200 operates the SW 203 to interrupt data transmission to the transmission lane buffer 204-2.

Subsequently, the lane management unit 220 transmits a lane-off signal to the transmission lane 210-2 to be deleted so as to turn off the transmission lane 210-2 (S456). The lane management unit 220 then changes the transmission lane connection state corresponding to the transmission lane ID 2 from on to off in the transmission lane management table 350 shown in FIG. 11. The lane management unit 220 also changes the connected transmission lane count and the transmission line bandwidth to the values after the deletion in the line management table 310 shown in FIG. 10 (S457). Specifically, the lane management unit 220 transmits a lane-off signal to the transmission lane 210-2 so as to turn off the transmission lane 210-2. In FIG. 11, the transmission lane connection state corresponding to the transmission lane ID 2 is changed from on to off. In FIG. 10, the connected transmission lane count 303 is changed from 2 to 1, and the transmission line bandwidth 304 is changed from 5.0 Gbits/s to 2.5 Gbits/s.

The lane management unit 220 then reports the ID of the operating transmission lane to the maintenance terminal 101-1 via the control unit 124 (S458). The maintenance terminal 101-1 reports the ID of the operating transmission lane to the maintenance terminal 101-2 of the relay device 113. In the relay device 113, the maintenance terminal 101-2 reports the ID of the operating transmission lane to the SW 245 via the control unit 133. The SW 245 determines that data outputted from a reception lane corresponding to the ID of the operating transmission lane is valid and outputs the reception data to the reception buffer 246.

Thus, the deletion process for one lane is completed. The lane management unit 220 determines whether there are other lanes to be deleted (S459). If S459 is YES, the lane management unit 220 returns to step 454. If S459 is NO, the lane management unit 220 completes the process. Note that multiple lanes may be handled at a time in steps 454 to 458 during the deletion process.

Next, referring to FIGS. 13 to 19, the lane addition process will be described. As for the operation state of the device, assume that only the transmission lane having ID 1 shown in FIG. 14 is on. This represents the state after the above-mentioned lane deletion process.

Figure 19:
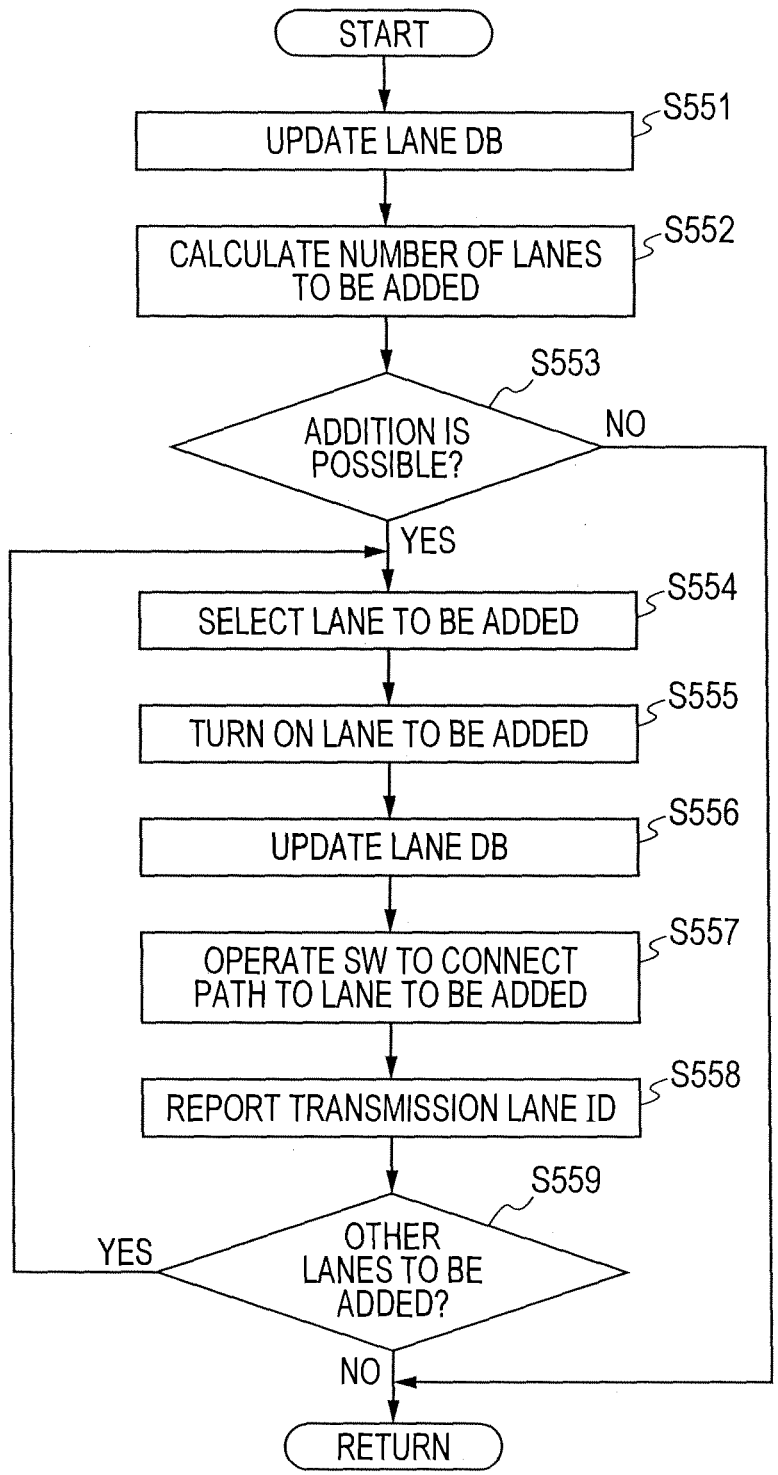
FIG. 19 is a flowchart of a data transmission device lane addition subroutine.

In FIG. 19, first, the lane management unit 220 updates the required bandwidth of the line management table 310 to the new required bandwidth reported by the control unit 124 (S551). Here, as shown in FIG. 15, assume that the required bandwidth has been changed from 2.5 Gbits/s to 5.0 Gbits/s. The lane management unit 220 calculates the number of lanes to be added (S552). Specifically, the lane management unit 220 demultiplexes the required bandwidth by the transmission line bandwidth (fraction rounded up) and compares the value obtained with the connected transmission lane count so as to determine whether transmission lanes can be added (S553). Here, 5.0[Gbits/s]/2.5[Gbits/s]=2. The value obtained exceeds the connected transmission lane count, 1. Thus, the lane management unit 220 determines that transmission lanes can be added. Since the difference is 2−1=1, the lane management unit 220 determines that the number of lanes to be added is 1. If the number of lanes satisfying the required bandwidth exceeds the maximum transmission lane count or if the comparison results in equality, the lane management unit 220 determines that there is no need to add transmission lanes and completes the process. Note that the number of lanes to be added may be multiple.

The lane management unit 220 then selects a lane to be added actually (S554). Specifically, the lane management unit 220 checks whether there is a transmission lane ID whose transmission lane connection state is off in the transmission lane management table 350. Since all transmission lanes other than that the transmission lane having ID 1 are off, the lane control unit 220 determines that any one of them should be added. Here, the transmission lane ID 2 is selected. The method and condition for selection are determined freely.

Upon determining the transmission lane to be added, the lane management unit 220 transmits a lane-on signal to the transmission lane 210-2 to be added to turn it on (S555). The lane management unit 220 then changes the transmission lane connection state of the transmission lane ID 2 from off to on in the transmission lane management table 350. The lane management unit 220 also changes the connected transmission lane count and the transmission line bandwidth to the values after the addition in the line management table 310 (S556). Specifically, in FIG. 18, the lane management unit 220 changes the transmission lane connection state of the transmission lane ID 2 from off to on. The lane management unit 220 also changes the connected transmission lane count and the transmission line bandwidth to 2 and 5.0 Gbits/s, respectively, in FIG. 17.

The lane management unit 220 also transmits to the lane selection unit 200 a switching signal for connecting the connection path leading to the selected transmission lane. The lane selection unit 200 operates the SW 203 to connect the path leading to the selected transmission lane (S557). Specifically, the lane selection unit 200 operates the SW 203 to start data transmission to the transmission lane buffer 204-2.

The lane management unit 220 also reports the ID of the operating transmission lane to the maintenance terminal 101-1 via the control unit 124 (S558). The maintenance terminal 101-1 reports the ID of the operating transmission lane to the maintenance terminal 101-2 of the relay device 113. The maintenance terminal 10-2 reports the ID of the operating transmission lane to the SW 245 via the control unit 133. The SW 245 determines that data outputted by a reception lane corresponding to the ID of the operating transmission lane is valid and outputs the reception data to the reception buffer 246.

Thus, the addition process for one lane is completed. The lane management unit 220 determines whether there are other lanes to be added (S559). If S559 is YES, the lane management unit 220 returns to step 554. If S559 is NO, the lane management unit 220 completes the process. Note that multiple lanes may be handled at a time in steps 554 to 558 during the addition process.

While this embodiment has been applied to the communication between the transmission unit 122 of the data transmission device 100 and the reception unit 131 of the relay device 113, it may be applied to the communication between the transmission unit 132 of the relay device 113 and the reception unit 123 of the data transmission device 100. The same goes for a second embodiment.

According to the first embodiment, it is possible to realize a data transmission device that can dynamically set up a transmission line satisfying the bandwidth required by the accommodated lines and can reduce power consumption by turning off the operation circuits of unnecessary lanes.

While the data transmission device 100 is separated from the relay device 113 in the above description, the relay device is also a data transmission device. Accordingly, a typical data transmission device includes a relay device.

Second Embodiment

According to the first embodiment, it is possible to dynamically set up a transmission line satisfying the bandwidth required by the accommodated lines as well as to reduce power consumption. If the required bandwidth does not vary, however, there occurs a difference in operating time between a connected transmission lane and an unconnected transmission lane. Specifically, an increase in operating time of a connected transmission lane increases the possibility that the transmission lane will fail. If only one lane is connected, the communication will be interrupted at worst. For this reason, a data transmission device according to a second embodiment changes transmission lanes used as the transmission line at a proper timing so as to level the operating times of the transmission lanes. Thus, the frequency of failure is reduced.

Figure 20:
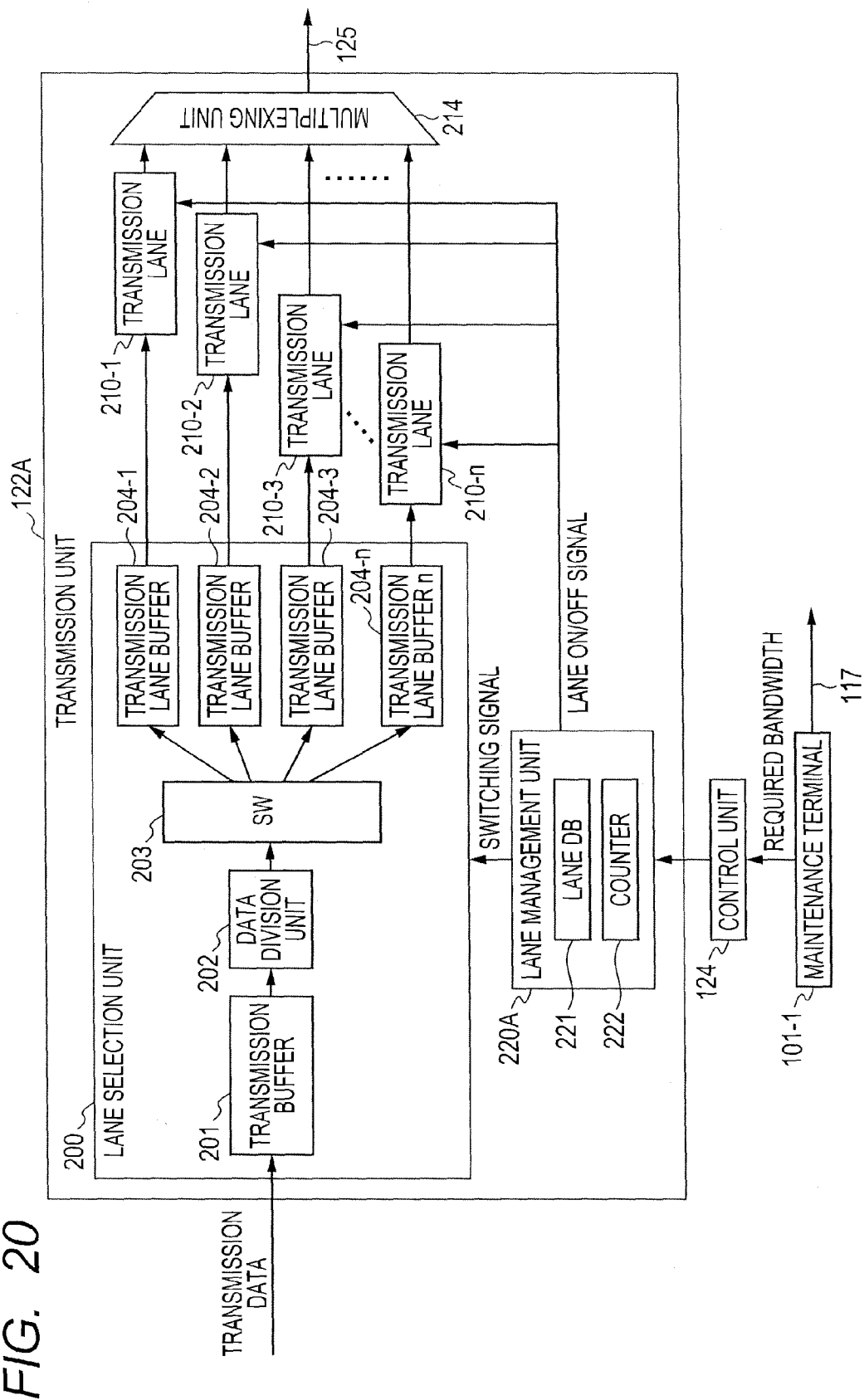
FIG. 20 is a block diagram (2) of a transmission unit of the data transmission device.

Referring to FIG. 20, a transmission unit 122A of the data transmission device 100 will be described. In FIG. 20, the only difference between the transmission unit 122A and the transmission unit 122 of FIG. 3 is that a lane management unit 220A includes a counter 222. The counter 222 measures the operating time of each lane.

Referring to FIGS. 21 and 22, a line management table 310 and a transmission lane management table 350A managed by a lane DB 221 will be described. The line management table 310 of FIG. 21 is the same as the line management table 310 of FIG. 5 and will not be described. On the other hand, the transmission lane management table 350A of FIG. 22 contains a cumulative operating time 340, which is not contained in the transmission lane management table 350 of FIG. 6. The transmission lane management table 350A indicates that the cumulative operating time of the transmission lane ID 1 is 10000 hours, that of the transmission lane ID 2 is 5000 hours, and those of the others are 0 hour. Note that the transmission lane bandwidth and the required bandwidth in FIG. 21 may be set to any values.

Next, referring to FIGS. 23 to 29, a transmission lane selection process will be described. Assume that the data transmission device 100 is operating on the basis of the settings in the lane DB 221 shown in FIGS. 21 and 22.

Generally, the lane management unit 220A measures the operating times of the operating transmission lanes using the counter 222 and rewrites the corresponding cumulative operating times in the transmission lane management table 350A at any time. In this embodiment, as shown in FIG. 22, the cumulative operating times of the operating transmission lanes having IDs 1 and 2 are 10000 hours and 5000 hours, respectively. The cumulative operating times of the nonoperating transmission lane IDs 3 to n are all 0 hour and the measurement thereof is stopped.

Figure 29:
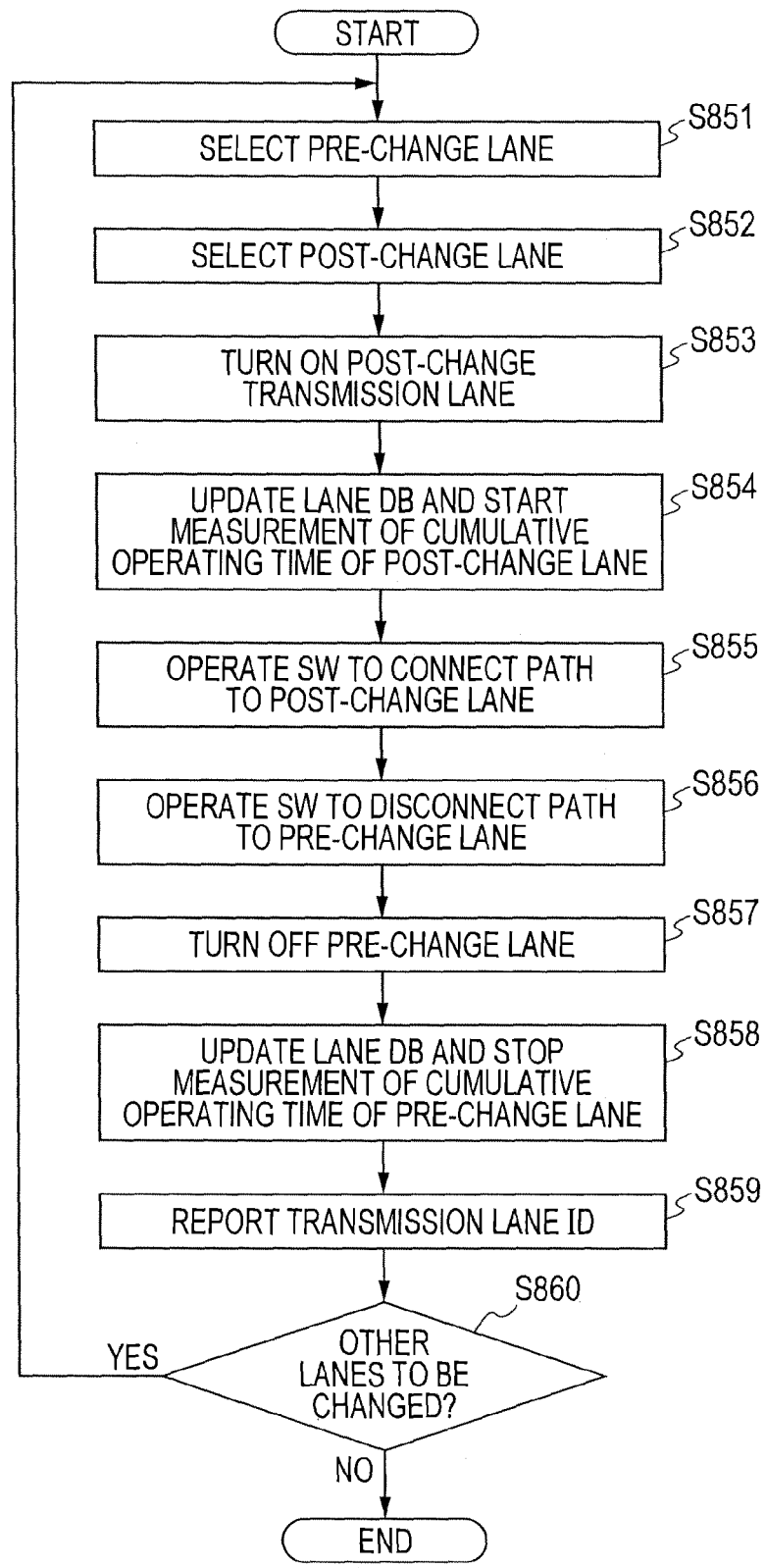
FIG. 29 is a flowchart of a data transmission device lane change process.

In FIG. 29, the lane management unit 220A starts a lane change process at any timing. The change may be performed randomly or at certain intervals. Alternatively, the change may be performed when the cumulative operating time of a transmission lane exceeds a given value or may be performed at other timings.

First, the lane management unit 220A selects a transmission lane to be turned off (hereafter referred to as a "pre-change lane") (S851). The lane management unit 220A uses the cumulative operating time of each lane as a selection criterion. The selection criterion may be composed of one or more conditions. For example, a pre-change lane may be selected in the descending order of the cumulative operating time. Alternatively, a transmission lane whose cumulative operating time has exceeded a given value may be selected. Alternatively, a pre-change lane may be selected randomly from among transmission lanes whose cumulative operating time has exceeded a given value. Alternatively, these selection criteria may be combined. Alternatively, the condition may be changed to another depending on the state of the device. Further, the number of lanes to be changed is not limited to one, and multiple lanes may be changed. In this embodiment, a single transmission lane 210 having the longest cumulative operating time is selected from among the operating transmission lanes. Specifically, in FIG. 24, the lane management unit 220A selects the transmission lane ID 1 as a pre-change lane because the cumulative operating time thereof is the longest.

The lane management unit 220A then selects a transmission lane to be turned on (hereafter referred to as a "post-change lane") (S852). The selection criterion may also be one or more. For example, a post-change lane may be selected in the ascending order of the cumulative operating time. Alternatively, a transmission lane whose cumulative operating time falls below a given value may be selected. Alternatively, a post-change lane may be selected randomly from among transmission lanes whose cumulative operating time falls below a given value. Alternatively, these selection criteria may be combined. The condition may be changed to another depending on the state of the device. In this embodiment, a transmission lane whose cumulative operating time is the shortest and whose ID has the smallest value is selected from among unconnected transmission lanes. Specifically, the lane management unit 220A selects, as a post-change lane, the transmission lane ID 3, whose cumulative operating time is the shortest and whose ID has the smallest value, from among the unconnected transmission lanes.

After selecting the post-change transmission lane, the lane management unit 220A transmits a lane-on signal to the post-change transmission lane so as to turn on the transmission lane for activation (S853). The lane management unit 220A then changes the transmission lane connection state corresponding to the post-change transmission lane ID from off to on in the lane DB 221 and starts the measurement of the cumulative operating time (S854). Specifically, the lane management unit 220A transmits a lane-on signal to the transmission lane 210-3 so as to turn on the transmission lane 210-3 for activation. As shown in FIG. 26, the lane management unit 220A changes the transmission lane connection state of the transmission lane ID 3 from off to on in the lane DB 221 and starts the measurement of the cumulative operating time.

The lane management unit 220A then transmits to the lane selection unit 200 a switching signal for connecting the connection path leading to the post-change lane. The lane selection unit 200 operates the SW 203 to connect the data transmission path leading to the selected lane (S855). Specifically, the lane selection unit 200 operates the SW203 to start data transmission to the transmission lane buffer 204-3.

Subsequently, the lane management unit 220A stops data output to the pre-change lane (S856). Specifically, the lane management unit 220A transmits to the lane selection unit 200 a switching signal for disconnecting the connection path leading to the pre-change lane. The lane selection unit 200 operates the SW 203 to stop data transmission to the selected transmission lane. Specifically, the lane selection unit 200 operates the SW 203 to stop data transmission to the transmission lane buffer 204-1.

Further, the lane management unit 220A transmits a lane-off signal to the pre-change transmission lane so as to turn off the transmission lane (S857). The lane management unit 220A also changes the connection state corresponding to the pre-change lane from on to off in the transmission lane management table 350A and stops the measurement of the cumulative operating time (S858). Specifically, as shown in FIG. 28, the lane management unit 220A changes the transmission lane connection state corresponding to the pre-change transmission lane ID 1 from on to off and stops the measurement of the cumulative operating time.

Further, the lane management unit 220A reports the ID of the operating transmission lane to the maintenance terminal 101-1 via the control unit 124 (S859). The maintenance terminal 101-1 reports the ID of the operating transmission lane to the maintenance terminal 101-2 of the relay device 113. The maintenance terminal 101-2 reports the ID of the operating transmission lane to the SW 245 via the control unit 133. The SW 245 determines that data outputted by a reception lane corresponding to the ID of the operating transmission lane is valid and outputs the reception data to the reception buffer 246.

Thus, the change process for one lane is completed. The lane management unit 220A then determines whether there are other lanes to be changed (S860). If S860 is YES, the lane management unit 220A returns to step 851. If S860 is NO, the lane management unit 220A completes the process. Note that multiple lanes may be handled at a time in steps 851 to 859 during the change process.

According to the second embodiment, it is possible to realize a data transmission device that can dynamically set up a transmission line satisfying the bandwidth required by the accommodated lines and can reduce power consumption by turning off the operation circuits of unnecessary transmission lanes and that can reduce the frequency of failure by leveling the operating times of the transmission lanes.

What is claimed is:
1. A data transmission device comprising:
   a line accommodation unit connected to accommodated lines;
   a transmission unit configured to transmit transmission data received from the line accommodation unit to a transmission line;

a reception unit configured to receive a signal from a reception line and to transfer the received signal to the line accommodation unit; and a control unit configured to control the line accommodation unit, the transmission unit, and the reception unit, wherein the transmission unit includes:
 a plurality of transmission lanes;
 a multiplexing unit configured to multiplex outputs of the transmission lanes;
 a transmission line selection unit configured to divide the transmission data and to distribute the divided transmission data to the transmission lanes; and
 a transmission lane management unit configured to transmit a transmission lane switching signal to the transmission line selection unit,
the control unit is configured to determine a number of operating ones of the transmission lanes on the basis of required-bandwidth information, and
the transmission lane management unit is configured to transmit transmission lane on or off signals for controlling turn-on or turn-off of the transmission lanes to the transmission lanes on the basis of the number and operating times of the operating transmission lanes,
wherein the reception unit includes:
 a plurality of reception lanes;
 a demultiplexing unit configured to demultiplex the received data for the reception lanes;
 a plurality of reception lane buffers corresponding to the reception lanes:
 a reception buffer; and
 a switch configured to select any one of signals of the reception lane buffers and to transfer the selected signal to the reception buffer and,
on the basis of ID information of a transmission lane from an opposite device, the switch is configured to regard data outputted by a corresponding one of the reception lanes as valid and to transfer the data to the reception buffer.

2. The data transmission device according to claim 1, wherein the transmission lanes are configured to encode the transmission data into data form according to the line format of the transmission line and to perform media conversion of the encoded transmission data.

3. The data transmission device according to claim 2, wherein the medium conversion is electric signal-to-optical signal conversion.

4. The data transmission device according to claim 1, wherein the transmission lane management unit is configured to manage the required bandwidth, a transmission lane bandwidth, a maximum transmission lane count, a currently connected lane count, and a transmission line bandwidth, and to control connection states of the transmission lanes.

* * * * *